(12) United States Patent
Klockiewicz et al.

(10) Patent No.: US 11,826,587 B2
(45) Date of Patent: Nov. 28, 2023

(54) EMERGENCY OXYGEN SYSTEM FOR AIRCRAFT WITH SWITCHING DEVICE AND A METHOD OF OPERATING AN EMERGENCY OXYGEN SYSTEM

(71) Applicant: Safran Aerotechnics SAS, Plaisir (FR)

(72) Inventors: Florian Damien Romain Klockiewicz, Elancourt (FR); Charles Christophe Xavir, Courdimanche (FR); Matthieu Luc Fromage, Saint-Arnoult-en-Yvelines (FR); Vincent Jean Pierre Marie Gillotin, Vauhallan (FR); Stuart David Dixon Walker, Paris (FR)

(73) Assignee: SAFRAN AEROTECHNICS SAS, Plaisir (FR)

( * ) Notice: Subject to any disclaimer, the term of this patent is extended or adjusted under 35 U.S.C. 154(b) by 1239 days.

(21) Appl. No.: 16/387,879

(22) Filed: Apr. 18, 2019

(65) Prior Publication Data
US 2019/0321660 A1 Oct. 24, 2019

Related U.S. Application Data

(60) Provisional application No. 62/659,201, filed on Apr. 18, 2018.

(51) Int. Cl.
*A62B 7/14* (2006.01)
*A62B 9/02* (2006.01)
(Continued)

(52) U.S. Cl.
CPC .................. *A62B 7/14* (2013.01); *A62B 9/02* (2013.01); *B64D 13/06* (2013.01); *B64D 11/00* (2013.01);
(Continued)

(58) Field of Classification Search
CPC .. A62B 7/14; A62B 9/02; B64D 13/06; B64D 2013/0681; B64D 2231/02; B64D 11/00; B64D 2231/025; Y02T 50/50
See application file for complete search history.

(56) References Cited

U.S. PATENT DOCUMENTS 3,536,070 A * 10/1970 Bovard .................... A62B 7/08
128/202.26
3,615,250 A 10/1971 Vernon
(Continued)

FOREIGN PATENT DOCUMENTS

| CN | 103754370 A | * | 4/2014 | ............ A61M 16/20 |
| EP | 2679499 A2 | | 1/2014 | |

(Continued)

OTHER PUBLICATIONS

English translation for CN 103754370, machine translated by SEARCH Clarivate Analytics, translated on Apr. 21, 2023.*

(Continued)

*Primary Examiner* — Tu A Vo
(74) *Attorney, Agent, or Firm* — Kilpatrick Townsend & Stockton LLP (57) ABSTRACT

An emergency oxygen system for aircraft comprising:
a breathing gas supply circuit to be connected upstream to a source of breathing gas and downstream to at least one mask,
a flow control valve configured to adjust the flow of breathing gas supplied to the mask,
an electronics board configured to control the flow control valve,
a power source,
a switching device interposed between the power source and the electronics board, the switching device comprising a switch configured to have a first state in which power from the power source is supplied to the elec- (Continued)

tronics board and a second state in which the electronics board is not supplied with power from the power source.

17 Claims, 2 Drawing Sheets

(51) Int. Cl.
 *B64D 13/06* (2006.01)
 *B64D 11/00* (2006.01)
(52) U.S. Cl.
 CPC .. *B64D 2013/0681* (2013.01); *B64D 2231/02* (2013.01); *B64D 2231/025* (2013.01); *Y02T 50/50* (2013.01)

(56) References Cited

U.S. PATENT DOCUMENTS

| | | | | |
|---|---|---|---|---|
| 3,981,302 | A * | 9/1976 | Veit | B64D 11/00 128/202.26 |
| 5,071,453 | A * | 12/1991 | Hradek | A62B 7/14 96/111 |
| 5,954,052 | A * | 9/1999 | McDonald | B64D 10/00 206/485 |
| 6,318,364 | B1 * | 11/2001 | Ford | B64D 10/00 128/204.29 |
| 6,984,900 | B1 * | 1/2006 | Bruwer | H05B 39/044 307/139 |
| 8,261,744 | B2 | 9/2012 | Rittner et al. | |
| 8,967,537 | B2 | 3/2015 | Rittner et al. | |
| 8,978,644 | B2 | 3/2015 | Rittner et al. | |
| 9,089,721 | B1 * | 7/2015 | Horstman | A62B 7/14 |
| 2002/0189617 | A1 * | 12/2002 | Cordero | B64D 11/00 128/205.25 |
| 2003/0000001 | A1 * | 1/2003 | McDonald | A62B 18/084 2/6.3 |
| 2006/0169283 | A1 * | 8/2006 | Schaeffer, Jr. | A62B 25/005 128/205.27 |
| 2007/0057121 | A1 * | 3/2007 | Callahan | H02G 3/32 244/118.5 |
| 2009/0314296 | A1 * | 12/2009 | Cannon | A62B 7/14 128/205.25 |
| 2011/0006778 | A1 * | 1/2011 | Kruse | A62B 27/00 324/537 |
| 2012/0205491 | A1 | 8/2012 | Rittner et al. | |
| 2013/0074836 | A1 * | 3/2013 | Contino | A62B 25/005 128/205.25 |
| 2013/0340760 | A1 * | 12/2013 | Brumley | B64D 11/00 128/204.29 |
| 2014/0000591 | A1 | 1/2014 | Hollm et al. | |
| 2015/0148995 | A1 * | 5/2015 | Scheffler | H02J 3/14 701/3 |
| 2015/0261379 | A1 * | 9/2015 | Kneuper | G06F 3/04883 345/173 |
| 2017/0001047 | A1 * | 1/2017 | Bricard | A62B 7/02 |
| 2017/0007859 | A1 | 1/2017 | Fromage | |
| 2017/0346297 | A1 * | 11/2017 | Chuang | H02J 4/00 |
| 2018/0232097 | A1 * | 8/2018 | Kneuper | G06F 3/0416 |
| 2019/0248494 | A1 * | 8/2019 | Ducos | A62B 25/00 |

FOREIGN PATENT DOCUMENTS

| | | | | |
|---|---|---|---|---|
| WO | | 2015128690 | 9/2015 | |
| WO | WO-2015197542 | A1 * | 12/2015 | ............... A62B 7/14 |

OTHER PUBLICATIONS

Europe Patent Application No. 19170145.7, Extended European Search Report, dated Sep. 20, 2019.

* cited by examiner

EMERGENCY OXYGEN SYSTEM FOR AIRCRAFT WITH SWITCHING DEVICE AND A METHOD OF OPERATING AN EMERGENCY OXYGEN SYSTEM

CROSS REFERENCE TO RELATED APPLICATIONS

This application claims the benefit of and priority to U.S. Provisional Patent Application Ser. No. 62/659,201, filed on Apr. 18, 2018, the entire contents of which application are hereby incorporated herein by this reference.

FIELD OF THE DISCLOSURE

The present invention relates to an emergency oxygen system for aircraft and a method of operating an emergency oxygen system.

BACKGROUND OF THE DISCLOSURE

During cruise portions of flight, most commercial passenger aircraft operate at altitudes exceeding fourteen thousand feet. At these altitudes, insufficient oxygen may be present in the ambient air to sustain human consciousness or life. Accordingly, cabins of the aircraft are pressurized, often to altitudes equating approximately eight thousand feet. At such "cabin altitudes," sufficient oxygen normally will be present in ambient air to avoid hypoxia and thereby sustain human consciousness and life.

Loss of cabin pressurization when an aircraft is flying above, e.g., fourteen thousand feet, therefore, creates risk of passengers (and crew) experiencing hypoxia. Aircraft hence typically are fitted with emergency oxygen systems configured to supply supplemental oxygen to passengers temporarily while an aircraft operator reduces the flight altitude of the aircraft. The systems include cup-shaped face masks connected to sources of oxygen via flexible tubing and stored pre-use in, for example, drop out boxes (DOBs).

These systems additionally require both electrical power and signals from the aircraft to function, thus creating significant power-management issues for operation of the aircraft. Existing systems, for example, use pyrotechnic-activated devices to break seals on oxygen bottles, typically requiring approximately 126 W of aircraft power to activate the pyrotechnics. Additional electrical power is required to operate the control boards of the systems and, in some cases, to actuate latches in the DOBs.

Commonly-owned U.S. Pat. No. 8,978,644 to Rittner, et al., whose contents are incorporated herein in their entirety by this reference, discusses this need for electrical energy to commence oxygen flow and control oxygen supply during emergencies. One such solution disclosed in the Rittner patent to reduce the amount of Peak power needed from the aircraft is to employ an energy storage unit (e.g. a rechargeable battery). The storage unit cooperates with an energy harvesting element (e.g. a Peltier or photovoltaic element) to recharge.

A general problem associated with modern aircraft is the desire to provide an overall lightweight construction of the aircraft to reduce fuel consumption of the aircraft. It is to be understood that such lightweight construction may comprise a reduction of weight of structural components like wings of the aircraft but may also comprise a reduction of the weight of cabin interior elements, including passenger service units (PSU) and the like. It is an object of the invention to provide an oxygen breathing device allowing such lightweight construction of modern aircraft.

A still further object in design of modern aircraft is to allow efficient manufacturing and maintenance of the aircraft to reduce manufacturing and maintenance costs. It is an object of the invention to provide an emergency oxygen system allowing such reduced manufacturing and maintenance costs.

A still further object is to retrofit existing aircrafts without inducing substantial modifications and incurring high costs.

SUMMARY OF THE DISCLOSURE

According to a first aspect, the invention provides an emergency oxygen system for aircraft comprising:
a breathing gas supply circuit to be connected upstream to a source of breathing gas (oxygen) and downstream to at least one mask, the breathing gas supply circuit comprising a flow control valve configured to adjust the flow breathing gas supplied to the mask,
an electronics board configured to control the flow control valve,
a power source,
a switching device interposed between the power source and the electronics board, the switching device comprising a switch configured to have a first state in which power from the power source is supplied to the electronics board and a second state in which the electronics board is not supplied with power from the power source.

So, the device of the present invention may be configured to be electrically inert (dormant)—thus not needing any stand-by power—until it is switched on for being used. Therefore, the electricity consumed is reduced which at least therefore reduce the fuel consumption, if the device is powered by the aircraft and may also reduce the weight of the aircraft and the maintenance cost (in order to check, charge and eventually change the battery) if the device is powered by a battery.

The emergency oxygen systems for aircraft rarely are needed during commercial flight, so any electricity used to power them in stand-by mode is effectively wasted. On the other hand, the devices need to operate as reliably as possible during certain emergencies, even if inadequate power might be available from the aircraft engines. Thus, for example, utilizing the invention together with storage batteries or capacitors as a power source could both allow the systems to be electrically autonomous (i.e. no power directly from the aircraft is required) while avoiding undue drain on the batteries when the oxygen supply system is idle.

The electronics board and the flow control valve may in particular adjust either the value of the flow of breathing gas supplied to the aircraft passenger or the time during which the breathing gas flows towards the passenger mask per breath. The electronics board and the flow control valve may also adjust the flow of breathing gas, so that the passenger has a determined quantity of breathing gas available.

According to another feature in accordance with the invention, preferably the power source is a stored power source, in particular a battery.

Therefore, extensive wiring, manufacturing efforts and increased weight are avoided, and retrofitting and modifications of the aircraft configuration are eased.

According to another feature in accordance with the invention, preferably the switching device comprises an input point and an output point, the power source is connected to the input point, the electronics board is connected to the output point, and the switching device has an impedance higher than 100,000 ohm, preferably higher than 500,000 ohm, in the second state between the input point and the output point.

Therefore, the power consumption of the switching device is very low when the switch is in the second state.

According to a supplementary feature in accordance with the invention, preferably the impedance between the input point and the output point is lower than 10 ohm, in the first state.

Therefore, power consumption of the switching device is very low when the switch is in the first state.

According to another feature in accordance with the invention, preferably the switch is of electrical or electronic type, the switching device further comprises an activation line, the switching device is configured to actuate the switch to switch from the second state to the first state when a (low power) activation signal is present in the activation line.

Therefore, the device may be energized (switched on) by a low power signal from an emergency system of the aircraft.

According to a supplementary feature in accordance with the invention, preferably the switching device is configured to uphold the switch in the first state, even if the activation signal in the activation line disappears.

Therefore, power consumption is reduced and control of the state of the switching device is eased.

According to a supplementary feature in accordance with the invention, preferably the switching device comprises an input point, an output point and an ON point, the power source is connected to the input point, the electronics board is connected to the output point, the switching device is configured to send the activation signal from the ON point to an ON line through the activation line, and the switching device is configured to send an output signal from the output point to the ON line through an upholding line.

Therefore, the activation signal has not to keep on being present to uphold the switching device in the first state which reduces power consumption.

According to another feature in accordance with the invention, preferably the emergency oxygen system comprises a test switch interposed between the power source and the activation line.

Therefore, the emergency oxygen system can be easily energized (switched on) for being tested.

According to another feature in accordance with the invention, preferably the emergency oxygen system comprises a receiver configured to receive an emergency signal and send the activation signal in the activation line.

Therefore, the device can be energized (switched on), in particular from the emergency system of the aircraft, without having to provide a wire for connecting the emergency system of the aircraft to the emergency oxygen system.

According to another feature in accordance with the invention, preferably the emergency oxygen system further comprises a container, at least one mask and a latch, the container includes a door movable between a closed position and an open position, the latch has a locking state and a releasing state, in the locking state, the latch is configured to secure the door in the closed position in order to maintain the mask within the container, in the releasing state, the latch is configured to release the door, the activation line is connected to the latch, and the latch is configured to be driven in the unlocking state when the activation signal is present in the activation line.

Therefore, the same signal is used for opening the door of the container containing the mask and energizing (switching on) the device.

According to an alternative feature in accordance with the invention, preferably the emergency oxygen system further comprises a container, at least one mask and a latch, the container includes a door movable between a closed position and an open position, the latch has a locking state and a releasing state, in the locking state, the latch is configured to secure the door in the closed position in order to maintain the mask within the container, in the releasing state, the latch is configured to release the door, and the electronics board is configured to control the unlocking state of the latch.

Therefore, no separate signal is required for opening the door of the container containing the mask as the emergency oxygen system can control the latch once energized (switched on).

According to another feature in accordance with the invention, preferably the switching device comprises a deactivation line configured to switch the switch from the first state to the second state in case a (low power) deactivation signal is present in the deactivation line, and the electronics board is configured to send the deactivation signal in the deactivation line.

Therefore, the device of the present invention further may return to an inert state when activity no longer is needed. Thus, power can be saved, in particular when the emergency oxygen system was energized (switched on) only for testing.

According to a supplementary feature in accordance with the invention, preferably the electronics board comprises an ambient pressure sensor configured to sense ambient pressure, and the electronics board is configured to determine whether ambient pressure sensed by the pressure sensor is higher than a depressurization threshold and send the deactivation signal in the deactivation line in case the ambient pressure is higher than the depressurization threshold.

Therefore, the emergency oxygen system can determine that it was energized (switched on) only for testing and it may switch off itself when the test procedure is completed.

According to a supplementary feature in accordance with the invention, preferably the electronics board comprises a controller configured to control the flow control valve based on the ambient pressure sensed by the ambient pressure sensor.

Therefore, the ambient pressure sensor enables to determine if emergency oxygen system is energized (switched on) for testing, and if not the ambient pressure sensor enables to adjust the flow of breathing gas supplied to the passenger(s), so that the passenger(s) are not supplied with more breathing gas than the required flow which depends on the ambient pressure.

According to another feature in accordance with the invention, preferably the emergency oxygen system comprises an actuator of aneroid type, and the actuator is configured to have a dimension below an ambient pressure threshold, so that the switch is in the first state.

Therefore, the emergency oxygen system can be automatically energized (switched on) when the ambient pressure is too low to enable passenger to normally breath ambient air without requiring supplemental wiring throughout the aircraft.

According to another feature in accordance with the invention, preferably the emergency oxygen system comprises an initiator with a Shape Memory Alloy element to cause a seal of the source of breathing gas to be punctured and the initiator is connected to the controller, preferably by an electrical wire, so that the initiator is controlled by the controller.

According to another feature in accordance with the invention, preferably the switch is a transistor.

A low-power signal may trigger the transistor to an "on" state so as to connect a power source to a to-be-powered product. An exemplary signal may be on the order of one milliwatt (1 mW) in some versions of the present invention which employ a metal-oxide-semiconductor field-effect transistor (MOSFET) as a low-power switch, although persons skilled in the art will recognize that lower or higher power signals conceivably may be utilized in connection with other types of switching components.

According to an alternative feature in accordance with the invention, preferably the switch is a relay.

According to another feature in accordance with the invention, preferably the emergency oxygen system further comprises the source of breathing gas.

According to another aspect, the invention provides a method of operating an emergency oxygen system including:

(i) interposing a switching device between a power source and an electronics board, (ii) causing the switching device to electrically connect the power source to the electronics board, and (iii) adjusting the flow of breathing gas supplied to aircraft passengers with the electronics board.

Therefore, the electrically-powered emergency oxygen system needs not utilize power from the aircraft when idle or in stand-by mode the emergency oxygen system as it may be electrically inert unless needed to supply oxygen. The power consumption is reduced (null) when the passenger needs no breathing gas and the flow of breathing gas is reduced to the minimum required by the passenger(s) when the ambient air does not provide enough oxygen to the passenger(s).

According to another feature in accordance with the invention, preferably the operation (ii) includes receiving an activation signal to cause the switching device to electrically connect the power source to the electronics board.

According to a supplementary feature in accordance with the invention, preferably the operation (iii) includes upholding (maintaining) the power source connected to the electronics board regardless of the activation signal.

According to an alternative supplementary feature in accordance with the invention, preferably the operation (ii) includes receiving the activation signal to cause the switching device to electrically connect the power source to the electronics board and to cause at least one mask released from a container.

According to another feature in accordance with the invention, preferably the operation (iii) includes transmitting a deactivation signal from the electronics board so as to cause the switching device to electrically disconnect the electronics board from the power source.

According to a supplementary feature in accordance with the invention, preferably the method comprises detecting a test procedure and during an operation (iv) achieving a test procedure and then transmitting the deactivation signal from the electronics board so as to cause the switching device to electrically disconnect the electronics board from the power source.

Thus, power can be saved.

According to a supplementary feature in accordance with the invention, preferably the test procedure includes receiving an activation signal and determining that ambient pressure is higher than a depressurization threshold.

According to another feature in accordance with the invention, preferably the operation (iii) includes adjusting the flow of breathing gas based on ambient pressure.

BRIEF DESCRIPTION OF THE DRAWINGS

Other objects, features, and advantages of the present invention will be apparent to persons skilled in the art with reference to the remaining text and drawings of this application

DETAILED DESCRIPTION

Figure 1:
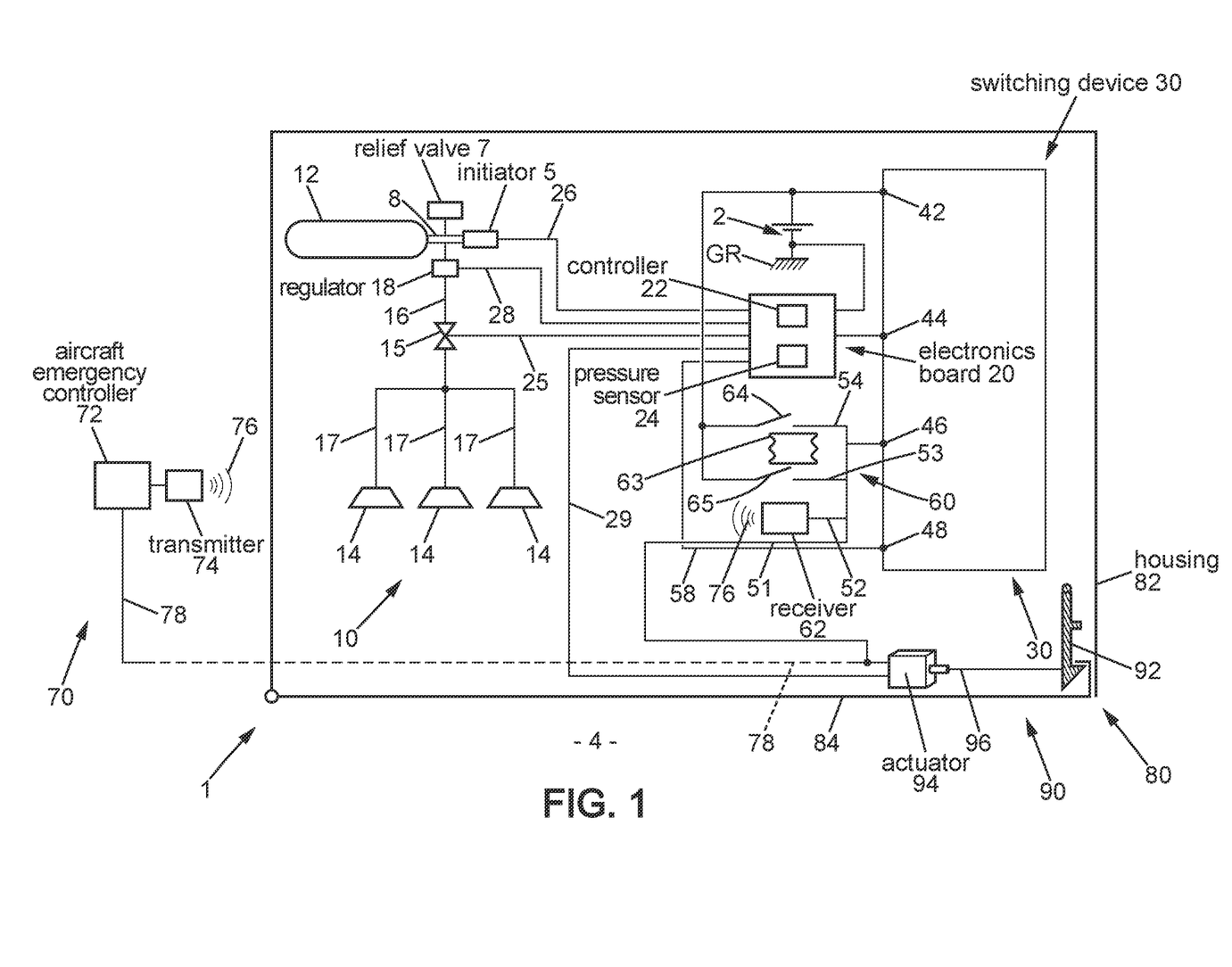
FIG. 1 is an exemplary emergency oxygen system illustrating certain features consistent with the invention, the emergency oxygen system including a switching device.

Depicted in FIG. 1 is an emergency oxygen system 1 constituting an exemplary implementation of the present invention.

The emergency oxygen system 1 is intended to deliver complementary breathing gas (oxygen) to passengers on-board an aircraft. The emergency oxygen system 1 is implemented in an aircraft, more accurately in the cabin of an aircraft. The cabin of the aircraft is pressurized so that cabin ambient air 4 is pressurized and includes a standard rate of oxygen (about 21%). The system emergency oxygen system 1 is intended to deliver complementary breathing gas (oxygen) to passengers on-board an aircraft in case of depressurization due to the failure of pressurization device or an uncontrolled leak between the cabin and outside, and/or when toxic gases, in particular fumes, are present in the cabin ambient air 4. In a variant, the emergency oxygen system 1 could be intended to deliver complementary oxygen to crewmembers.

As shown in FIG. 1, the emergency oxygen system 1 mainly comprises a breathing gas supply circuit 10, an electronics board 20, a power source 2 and a switching device 30. The emergency oxygen system 1 also comprises an activation device 60.

In the embodiment shown in FIG. 1, the power source 2 is a stored power source, preferably a battery. The battery is preferably a non-rechargeable battery, preferably of alkaline type. But, the battery can also be a rechargeable battery, preferably of cadmium type, but it can also be of lithium type or other convenient type. In a variant of power source of stored type, the power source can comprise a capacitor and/or a coil. In another variant, any desired source may be utilized, in particular stabilized power supply. Possible alternate or additional implementations may include electromagnetic induction (power and/or data), light modulation, etc.

The breathing gas supply circuit 10 comprises a source of breathing gas 12, a regulator 18, a delivery valve 15, a plurality (three are illustrated) of masks 14 for passengers (users), first tubing 16 and second tubing 17. In a variant, the breathing gas supply circuit 10 may comprise a plurality of delivery valves 15, one per mask 14. In a variant, the breathing gas supply circuit 10 could comprise only one mask.

The delivery valve 15 is disposed between the source of breathing gas 12 and the mask 14 The delivery valve 15 is connected to the source of breathing gas 12 by the first tubing 16, preferably rigid tubing, which supplies the delivery valve 15 with breathing gas.

The illustrated masks 14 are face masks having a cup-shape internally defining a cavity and may be provided with a reservoir (not illustrated). The masks 14 are connected to the delivery valve 15 by the second tubing 17, preferably flexible tubing. The masks 14 preferably comprise at least one inlet valve through which breathing gas flows into the cavity, an ambient valve which enables each passenger to breath cabin ambient air 4 diluting the breathing gas and an exhalation valve to enable gas within the cavity to exhaust the masks 14 when the passenger exhales.

The electronics board 20 comprises a controller 22 and a pressure cabin altitude sensor 24. The cabin altitude sensor 24 senses the pressure within the cabin 4 (also referred to as cabin altitude).The controller 22 is configured to control the delivery valve 15 to provide a flow of breathing gas to the masks 14 through second tubing 17, in order to supply aircraft passengers with breathing gas when the cabin altitude (pressure in the cabin) is sufficiently high as to induce hypoxia. In a continuous supply mode, the flow of breathing gas is adjusted based on the number of masks 14 used by a passenger and on cabin pressure sensed by the pressure sensor 24. Preferably, the flow is adjusted to a plurality of non-null values. In an alternative supply mode, the flow may be interrupted to adjust a volume of breathing gas (preferably to a plurality of non-null values) per breath based on the ambient pressure.

Lines 25 schematically represents the connection between the controller 22 and the delivery valve 15 which may be wires or any appropriate known connection, such as radio, Bluetooth and wifi for instance.

The breathing gas supply circuit 10 additionally may include a manifold 8 in gaseous communication with the source of breathing gas 12. The manifold 8 may, if appropriate, have a relief valve 7 or other means of venting gas if the pressure thereof exceeds a particular threshold. Downstream of the manifold 8 may be a HP reducer and/or a regulator 18, which functions to decrease or otherwise regulate the pressure of the oxygen from the manifold 8 before the oxygen flows to passengers of the aircraft. The HP reducer and/or the regulator 18 preferably reduces the absolute pressure between 1.5 bar and 6 bar.

The regulator 18 may be controlled by the controller 22 to adjust the absolute pressure downstream the regulator 18, based on the ambient pressure. In such a case, the delivery valve 15 is optional. The regulator 18 may be electrically controlled by wire 28 or any appropriate known connection, such as radio, Bluetooth and wifi for instance. A more detailed description of such a real-time controlled regulator may be found in document WO 2015/128690A1.

Also, included as part of the breathing gas supply circuit 10 may be an initiator 5. The source of breathing gas 12 is initially sealed. The initiator 5 may comprise any suitable mechanism for establishing gas flow from the source of breathing gas 12 to the manifold 8. One possible version of initiator 5 may utilize at least one SMA (Shape Memory Alloy) whose change in shape upon heating may cause a seal of the source of breathing gas 12 to be punctured. The initiator 5 is connected to the controller 22 by an electrical wire 26 or any appropriate known connection, so that the initiator 5 is controlled by the controller 22.

The breathing gas supply circuit 10 may further comprise an aircraft altitude sensor, an exhalation gas sensor and a blood oxygen saturation sensor connected to the controller 22, in order to adjust the flow of breathing gas.

The emergency oxygen system further comprises a container 80. The container 80 comprises a housing 82 having an opening and a door 84. The door 84 is movable with respect to the housing 82 between a closed position (shown in FIG. 1) and an open position. In the closed position, the door 84 obstructs the opening of the housing 82. In the open position, the door 84 is away from the opening. In the illustrated embodiment, the door 84 is rotatably mounted on the housing 82 between the closed position and the open position.

In the embodiment shown in FIG. 1, before use (emergency situation) the breathing gas supply circuit 10, the power source 2, the electronics board 20, the switching device 30 and the activation device 60 are within the housing 82 and the door 84 is in the closed position which thus define a passenger service unit (PSU). When the door 84 is in the open position, the masks 14 can drop outside of the housing 82 to be caught by the passengers seated on the seats which are below the container 80.

The emergency oxygen system 1 further comprises a latching assembly 90 to secure the door 84 in the closed position. The latching assembly 90 comprises a lever 92, an actuator 94 and a shape memory based wire 96. The lever 92 forms a latch and is movable with respect to the housing 82 between a protruding position and a retracted position. In the embodiment shown in FIG. 1, the lever 92 is rotatably mounted on the housing 82. As shown in FIG. 1, in the protruding position the lever engages the door 84, in order to secure the door 84 in the closed position. In the retracted position, the lever 92 disengages the door 84, so that the door 84 is released and may move towards the open position by gravity.

The lever 92 is urged, for instance by a spring (not illustrated), towards the protruding position. The shape memory material based wire 96 is connected at an end to the lever 92 and at an opposite end it is connected to the housing 82. The actuator 94 may actuate the shape memory material based wire 96, by heating the shape memory material based wire 96, in order to produce a contraction of the length of the shape memory material based wire 96, so that the lever 92 moves from the protruding position to the retracted position. A release hole (not illustrated) may be provided in the door to manually move the lever 92 into the retracted position.

The emergency oxygen system 1 comprises an aircraft emergency system 70. Preferably, the aircraft is equipped with a plurality of containers 80 each container 80 enclosing one breathing gas supply circuit 10, one power source 2, one electronics board 20, one switching device 30 and one activation device 60 and being dedicated to a row of (2 to 6) seats whereas the aircraft is equipped with only one aircraft emergency system 70. In the embodiment illustrated, the aircraft emergency system 70 comprises an aircraft emergency controller 72 and a transmitter 74. In case of emergency situation, such as depressurization or presence of fumes, the aircraft emergency controller 72 sends a door opening signal 78 to the actuator 94 in order to actuate the shape memory material based wire 96 and open the door 84 and/or control the transmitter 74 in order to send an emergency signal 76. In the embodiment shown in FIG. 1, the door opening signal 78 is transmitted by a wire to each container 80 and the emergency signal 76 is transmitted without wire, for instance by radio, Bluetooth, wifi or the like.

Instead of being controlled by the aircraft emergency system 70 the latching assembly 90 can be controlled by the controller 22. In such a case, when the controller 22 supplied in power from the power source 2, the controller 22 controls the actuator 94 in order to move the lever in the retracted position in order to open the door 84. Line 29 schematically represents the connection between the controller 22 and the actuator 94.

In the embodiment shown in FIG. 1, the power source 2 is a battery having a positive terminal (or phase pole) and a negative terminal (or neutral pole).

The switching device 30 is interposed between the power source 2 and the electronics board 20, in order to connect/disconnect the power supply of the electronics board 20. The switching device 30 comprises a main switch T1 configured to have a first state (ON state) in which the power from the power source 2 is supplied to the electronics board 20 (the electronics board 20 is connected to the power source 2) and a second state (OFF state) in which the electronics board 20 is not supplied with power from the power source 2 (the electronics board 20 is disconnected from the power source 2).

Figure 2:
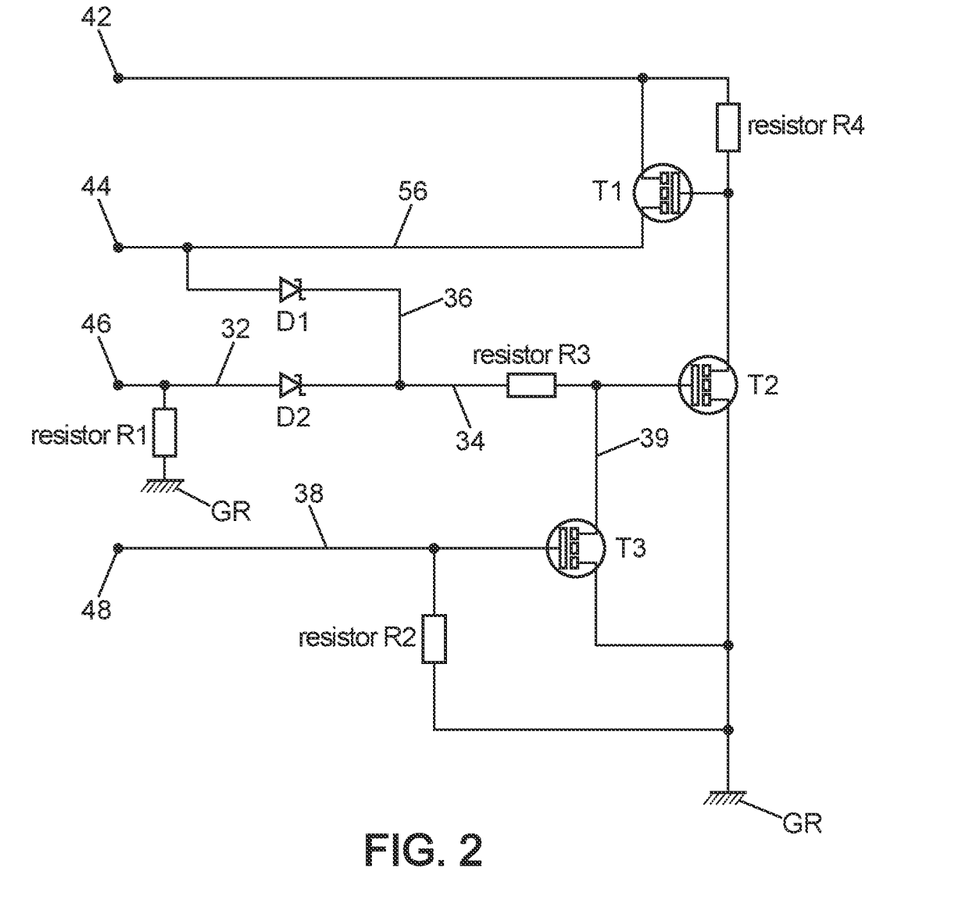
FIG. 2 illustrates in more detail the switching device.

In the embodiment shown in FIGS. 1 and 2, the switching device 30 cuts only the connection of the electronics board 20 to the positive terminal of the power source 2, the connection of the electronics board 20 to the negative terminal (ground GR) of the power source 2 remaining. In a variant, the switching device 30 could simultaneously cut both the connection of the electronics board 20 to the positive terminal and to the negative terminal of the power source 2.

The switching device 30 comprises an input point (terminal) 42, an output point (terminal) 44, an ON point (terminal) 46 and an OFF point (terminal) 48. The power source 2 is connected to the input point 42. The electronics board 20 is connected to the output point 44 to enable the electronics board 20 to be powered. The activation device 60 is connected to the ON point 46 in order to control the main switch T1 to switch from the second state to the first state (ON state). The controller 22 is connected to the OFF point 48 in order to control the main switch T1 to switch from the first state to the second state (OFF state).

It should be noticed that the input point 42, the output point 44, the ON point 46 and the OFF point 48 are specified for the understanding of the emergency oxygen system 1, but may be distinguishable as particular points. Moreover, the switching device 30, the activation device 60 and the electronics board 20 may be supported by the same support element (printed circuit board).

The activation device 60 is connected to the aircraft emergency controller 72 and/or the actuator 94, so that a first activation signal 51 is transmitted to the ON point 46 of the switching device 30 consecutively to the door opening signal 78 sent by the aircraft emergency controller 72. The first activation signal 51 may be identical to the door opening signal 78, the door opening signal 78 being transmitted to the ON point 46 of the switching device 30, but in variant (not illustrated) it may indirectly derives from the door opening signal 78, for instance as being sent by a sensor detecting the open position (or not closed position) of the door 84.

The activation device 60 comprises a receiver 62 configured to receive the emergency signal 76 sent by the transmitter 74 of the aircraft emergency system 70 and send a second activation signal 52 to the switching device 30 through the ON point 46.

The activation device 60 comprises a depressurization switch 65 and an aneroid type actuator 63. In the embodiment illustrated in FIG. 1, the depressurization switch 65 is interposed between the power source 2 and the ON point 46 of switching device 30. The depressurization switch 65 is urged to an open state (OFF state) when the cabin of the aircraft is normally pressurized. In case of depressurization, the aneroid type actuator 63 expends and moves the depressurization switch 65 in a closed state (ON state) in which the depressurization switch 65 makes electrical circuit between the power source 2 and the ON point 46, so that a third activation signal 53 is sent to the switching device 30 through the ON point 46.

The activation device 60 further comprises a test switch 64. In the embodiment illustrated in FIG. 1, the test switch 64 is interposed between the power source 2 and the ON point 46 of switching device 30. The test switch 64 is urged to the open state (OFF state). In order to initiate a testing procedure, the test switch 64 is depressed and moves in a closed state (ON state) in which the depressurization switch 64 makes electrical circuit between the power source 2 and the ON point 46, so that a fourth activation signal 54 is sent to the switching device 30 through the ON point 46.

The controller 22 may send a deactivation signal 58 to the switching device 30 through the deactivation point 48. In particular, when ambient pressure sensed by the pressure sensor 24 is higher than a depressurization threshold, the controller 22 controls a test procedure and then sends the deactivation signal 58 in the deactivation line.

As shown in FIG. 2, the switching device 30 comprises the main switch T1, an ON switch T2 and an OFF switch T3. The OFF switch T3 controls the state of the ON switch T2, which in turn controls the state of the main switch T1.

In the embodiment shown in FIG. 2, the main switch T1, the ON switch T2 and the OFF switch T2 are transistors. The main switch T1 is a P-type MOSFET. The ON switch T2 and the OFF switch T3 are N-type MOSFETs. Transistor.

In a variant (not illustrated) the main switch T1, the ON switch T2 and the OFF switch T3 could each be a relay, preferably the main switch T1 and the ON switch T2 being of normally open type, and the OFF switch T3 being of normally closed type. The substitution of relays for transistor as above mentioned would not substantially modify the operation of the switching device 30, but energy efficiency of the emergency oxygen system 1 would be reduced.

The main switch T1 is interposed electrically between (the input point 42 connected to) the power source 2 and (the output point 44 connected to) the electronics board 20. The main switch T1 functions as a low-power switch, either electrically connecting the electronics board 20 to the power source 2 or electrically disconnecting the electronics board 20 from the power source 2, depending on its operational state. When the main switch T1 is in the ON state, an output signal 56 from the power source 2 (through the input point 42) is sent to the electronics board 20 (through the output point 44). When the main switch T1 is in the OFF state, no output signal 56 is sent to the electronics board (through the output point 44).

The ON switch T2 may be driven in the ON state by the first activation signal 51, the second activation signal 52, the third activation signal 53 or the fourth activation signal 54 through an activation line 32 and an ON line 34.

The ON switch T2 may also be driven by the output signal 56, uphold in the ON state, through an upholding line 56 and the activation line 34.

Diodes D1 (in the upholding line 56) and D2 (in the activation line 32) isolate the output signal 56 through the upholding line 36 from the first activation signal 51, the second activation signal 52, the third activation signal 53 or the fourth activation signal 54 through the activation line 32 other (i.e. performing a logical "or" function to supply only one of the activation signals 51, 52, 53, 54 and output signal 56 to ON switch T2 at any given time).

Resistor R1 serves as a pull-down resistor for the first activation signal 51, the second activation signal 52, the third activation signal 53 or the fourth activation signal 54 in the activation line 32. Resistor R2 serves as a pull-down resistor for the deactivation signal 58 in a deactivation line 38 connected to the deactivation point 48. Resistor R3 in the activation line 34 functions to allow OFF switch T3 to control ON switch T2 without shorting the Output signal 56 to ground GR. Resistor R4 prevents shorting the power source 2 to ground GR when the ON switch T2 is driven in the ON state.

The OFF switch T3 may be driven by the deactivation signal 58 in the ON state sent in the deactivation line 38 from the electronics board 20. Consequently, the ON line 34 is connected to ground GR, so that the ON switch T2 is driven in the OFF state and the main switch is then driven in the OFF state.

In essence, therefore, at least one version of the present invention may provide a convenient electro-mechanical emergency oxygen system which passively disconnects (main switch T1 in OFF state) an electrical product (electronics board 20) from its power source 2, reduces wiring on-board an aircraft, and facilitates maintainability. A low-power signal may be supplied by the aircraft to trigger a MOSFET or other switch (ON switch T2) so as to connect (main switch T1 in ON state) the product (electronics board 20) to the power source. Once connected, the power source 2 maintains the electrical connection based on its own voltage. Another MOSFET or similar component (OFF switch T3) allows the product (electronics board 20) to force disconnection (main switch T1 in OFF state) from the power source 2 when needed (e.g. during or alter a periodic maintenance phase).

What is claimed is:

1. An emergency oxygen system for aircraft comprising:
a breathing gas supply circuit to be connected upstream to a source of breathing gas and downstream to at least one mask, the breathing gas supply circuit comprising a flow control valve configured to adjust a flow of breathing gas supplied to the mask,
an electronics board configured to control the flow control valve,
a power source,
a switching device interposed between the power source and the electronics board, the switching device comprising a switch configured to have a first state in which power from the power source is supplied to the electronics board and a second state in which the electronics board is not supplied with power from the power source, wherein:
the switch is an electrical or electronic switch,
the switching device further comprises an activation line,
the switching device is configured to actuate the switch to switch from the second state to the first state when an activation signal is present in the activation line,
the switching device comprises an input point, an output point and an ON point,
the power source is connected to the input point,
the electronics board is connected to the output point,
the switching device is configured to send the activation signal from the ON point to an ON line through the activation line, and
the switching device is configured to send an output signal from the output point to the ON line through an upholding line.

2. The emergency oxygen system according to claim 1 wherein the power source is a stored power source.

3. The emergency oxygen system according to claim 1 wherein:
the power source is connected to the input point,
the electronics board is connected to the output point, and
the switching device has an impedance higher than 100,000 ohm in the second state between the input point and the output point.

4. The emergency oxygen system according to claim 1 wherein the switching device is configured to uphold the switch in the first state, even if the activation signal in the activation line disappears.

5. The emergency oxygen system according to claim 1 wherein the emergency oxygen system comprises a test switch interposed between the power source and the activation line.

6. The emergency oxygen system according to claim 1 wherein the emergency oxygen system comprises a receiver configured to receive an emergency signal and send the activation signal in the activation line.

7. The emergency oxygen system according to claim 1 wherein:
the emergency oxygen system further comprises a container, at least one mask and a latching assembly,
the container includes a door movable between a closed position and an open position,
the latching assembly has a locking state and a releasing state,
in the locking state, the latching assembly is configured to secure the door in the closed position, in order to maintain the mask within the container,
in the releasing state, the latching assembly is configured to release the door,
the activation line is connected to the latching assembly, and
the latching assembly is configured to be driven in the releasing state when the activation signal is present in the activation line.

8. The emergency oxygen system according to claim 1 wherein:
the emergency oxygen system further comprises a container, at least one mask and a latching assembly,
the container includes a door movable between a closed position and an open position,
the latching assembly has a locking state and a releasing state,
in the locking state, the latching assembly is configured to secure the door in the closed position, in order to maintain the mask within the container,
in the releasing state, the latching assembly is configured to release the door, and
the electronics board is configured to control the releasing state of the latching assembly.

9. The emergency oxygen system according to claim 1 wherein:
the switching device comprises a deactivation line configured to switch the switch from the first state to the second state in case a deactivation signal is present in the deactivation line, and
the electronics board is configured to send the deactivation signal in the deactivation line.

10. A method of operating the emergency oxygen system according to claim 1, the method including: (i) interposing the switching device between the power source and the electronics board, (ii) causing the switching device to electrically connect the power source to the electronics board, and (iii) adjusting the flow of breathing gas supplied to an aircraft passenger with the electronics board.

11. The method according to claim 10 further includes receiving the activation signal to cause the switching device to electrically connect the power source to the electronics board.

12. The method according to claim 11 further includes upholding the power source connected to the electronics board regardless of the activation signal.

13. The method according to claim 11 further includes receiving the activation signal to cause the switching device to electrically connect the power source to the electronics board and to cause the at least one mask released from a container.

14. The method according to claim 10 further includes transmitting a deactivation signal from the electronics board so as to cause the switching device to electrically disconnect the electronics board from the power source.

15. The method according to claim 14 wherein the method comprises detecting a test procedure and during an operation achieving the test procedure and then transmitting the deactivation signal from the electronics board so as to cause the switching device to electrically disconnect the electronics board from the power source.

16. An emergency oxygen system for aircraft comprising:
a breathing gas supply circuit to be connected upstream to a source of breathing gas and downstream to at least one mask, the breathing gas supply circuit comprising a flow control valve configured to adjust the flow of breathing gas supplied to the mask,
an electronics board configured to control the flow control valve,
a power source,
a switching device interposed between the power source and the electronics board, the switching device comprising a switch configured to have a first state in which power from the power source is supplied to the electronics board and a second state in which the electronics board is not supplied with power from the power source, wherein:
the switching device comprises a deactivation line configured to switch the switch from the first state to the second state in case a deactivation signal is present in the deactivation line,
the electronics board is configured to send the deactivation signal in the deactivation line,
the electronics board comprises an ambient pressure sensor configured to sense ambient pressure, and
the electronics board is configured to determine whether ambient pressure sensed by the pressure sensor is higher than a depressurization threshold and send the deactivation signal in the deactivation line in case the ambient pressure is higher than the depressurization threshold.

17. The emergency oxygen system according to claim 16 wherein the electronics board comprises a controller configured to control the flow control valve based on the ambient pressure sensed by the ambient pressure sensor.

* * * * *